(12) United States Patent  (10) Patent No.: US 6,364,497 B1
Park et al.  (45) Date of Patent: Apr. 2, 2002

(54) BACKLIGHT SYSTEM

(75) Inventors: Euk-Byoung Park, Gunpo; Jong-Hun Kim, Taejon; Hoon-Soon Lee, Choongiu; Yoon-Keun Lee, Seoul; Jeong-Su Yu, Daejeon, all of (KR)

(73) Assignee: L G Chemical Ltd., Seoul (KR)

( * ) Notice: Subject to any disclaimer, the term of this patent is extended or adjusted under 35 U.S.C. 154(b) by 0 days.

(21) Appl. No.: 09/673,696

(22) PCT Filed: Mar. 24, 2000

(86) PCT No.: PCT/KR00/00257

§ 371 Date: Oct. 17, 2000

§ 102(e) Date: Oct. 17, 2000

(87) PCT Pub. No.: WO00/57241

PCT Pub. Date: Sep. 28, 2000

(30) Foreign Application Priority Data

Mar. 24, 1999 (KR) ............................................. 99-10049
Jun. 30, 1999 (KR) ............................................. 99-25604
Jul. 5, 1999 (KR) ............................................. 99-26934
Jul. 13, 1999 (KR) ............................................. 99-28238

(51) Int. Cl.$^7$ ................................................. F21V 7/04
(52) U.S. Cl. ............................. 362/31; 362/26; 349/64
(58) Field of Search ............................ 362/26, 27, 31; 385/146; 349/65, 64

(56) References Cited

U.S. PATENT DOCUMENTS 4,542,449 A * 9/1985 Whitehead .................. 362/330
5,587,816 A * 12/1996 Gunjima et al. .......... 349/64 X
5,751,390 A * 5/1998 Crawford et al. ......... 349/64 X
6,175,399 B1 * 1/2001 Mitsui et al. ............. 349/64 X

* cited by examiner

Primary Examiner—Stephen Husar
(74) Attorney, Agent, or Firm—Vinson & Elkins L.L.P.

(57) ABSTRACT

A backlight system for use in display devices including liquid crystal displays, or in advertising means or in lighting devices includes one or more light sources, a light-glide panel, a light reflecting film, an anisotropic light diffusing film, and a light collimating film. A light source is positioned at one or more edges of the light-guide panel in a predetermined direction. A light reflecting film is placed below the light-guide panel. An anisotropic light diffusing film is placed over the light-guide panel. The anisotropic light diffusing film has directionally different diffusing properties. The light collimating film has a top surface and a smooth bottom surface. The top surface of the light collimating film includes a lenticular layer extending in a predetermined direction. The lenticular layer has a plurality of linear prisms. A reflective polarizer can be employed over the light collimating film.

24 Claims, 14 Drawing Sheets

BACKLIGHT SYSTEM

BACKGROUND OF THE INVENTION (a) Field of the Invention

The present invention relates to a backlight system for display devices including liquid crystal displays, or for advertising means, or for lighting devices and, more particularly, to a backlight system which can serve to produce high luminance in display device applications.

(b) Description of the Related Art

Generally, backlight systems include a light-guide panel, one or more light sources provided at one or more edges of the light-guide panel with one or more light reflecting lamp housings, a light reflecting film positioned under the light-guide panel, and so on. The ray profile just emerging from the light-guide panel is inappropriate for being directly applied to the display devices. So, it is necessary to modify the ray profile. For this reason, a plurality of optical films should be employed with the light-guide panel. However, when a large number of optical films are employed for that purpose, it involves a complicated configuration and increased production cost. FIG. 10 is an exploded perspective view of a liquid crystal display using a backlight system based on U.S. Pat. No. 4,542,449 where a relatively large number of optical films are introduced. As shown in FIG. 10, the backlight system includes a light source 1, a light reflecting lamp housing 2, a light-guide panel 3, and a light reflecting film 4. The light source 1 with a light reflecting lamp housing 2 is provided at an edge of the light-guide panel 3, and the light-guide panel 3 is sequentially overlaid with a light diffusing film 5, a first and a second light collimating films 6 and 7, and finally a liquid crystal panel 8. A predetermined pattern (not shown) is formed at a top or bottom surface of the light-guide panel 3. A lenticular layer 9 having a plurality of prisms each with a right-angled isosceles triangular shape is formed at top surfaces of the first and of the second light collimating films 6 and 7, respectively. The light collimating films 6, 7 are placed one over the other such that the longitudinal direction of each lenticular layer on the films 6, 7 is at a predetermined angle 90° to one another. Since a number of optical films are used, it can be said that such a configuration involves complicated fabrication steps, and also, increased production cost.

In order to enhance the overall luminance of display devices using the backlight system as shown in FIG. 10, a reflective polarizer (not shown) may be additionally employed over the second light collimating film 7. When the liquid crystal panel 8 is placed over the reflective polarizer, an absorptive polarizer (not shown) can be additionally interposed between them. Cholesteric liquid crystal (CLC) polarizers or DBEF® of Minnesota Mining and Manufacturing Company can be used as the reflective polarizer. The CLC polarizers have optical characteristics of reflecting one of two circularly polarized components of the incident light while transmitting the other circularly polarized component of the incident light. In accordance with the optical characteristics of the liquid crystal panels used, the circularly polarized component of the light emerging from the CLC polarizer needs to be changed into a linearly polarized component by using a λ/4 retarder. In contrast, the DBEF® has optical characteristics of reflecting one of two linearly polarized components of the incident light while transmitting the other linearly polarized component of the incident light. When such a reflective polarizer is employed in the backlight system, it is theoretically possible to obtain an 100% enhanced luminance compared to that of the backlight system having no reflective polarizer if any light absorption does not occur inside the backlight system. However, in the conventional backlight system with a reflective polarizer, the actually achieved enhancement rate of the luminance is much lower than the expected value. For example, in portable computers using a backlight system with two light collimating films as shown in FIG. 10, low luminance enhancement rates of from 25% to 30% are exhibited. This is because such a backlight system has a complicated configuration, hence a considerble amount of light is lost while recycling through the various optical components in the backlight system.

SUMMARY OF THE INVENTION

It is an objective of the present invention to provide a backlight system which can be cost-effectively fabricated with a simplified structure using a reduced number of optical films.

It is another objective of the present invention to provide a backlight system which can greatly enhance luminance when used with a reflective polarizer.

These and other objectives can be achieved by a backlight system according to the present invention, which includes one or more light sources, a light-it-guide panel, a light reflecting film, an anisotropic light diffusing film (ADF), and a light collimating film. One or more light sources with one or more light reflecting lamp housings are positioned at one or more edges of the light-guide panel. The light-guide panel is made of transparent dielectric materials. The light reflecting film is placed below the light-guide panel. The ADF is placed over the light-guide panel and is made of transparent dielectric materials. The ADF has directionally different diffusing properties. The light collimating film is placed over the ADF and is made of transparent dielectric materials. One surface of the light collimating film is smooth and faces the ADF. The other surface of the light collimating film includes a lenticular layer having a plurality of prisms and extending in a predetermined direction. The cross-section of the lenticular layer is of a series of triangles. Additionally, the reflective polarizer can be placed over the light collimating film.

One surface of the light-guide panel, facing the ADF includes a lenticular layer extending in a predetermined direction, and the other surface of the light-guide panel, facing the light reflecting film includes a predetermined pattern. The local density of patterns becomes larger at positions more distant to the light source than those closer to the light source 21. The lenticular layer has a plurality of prisms and thus the cross-section of the lenticular layer is a series of triangles, or particularly, a series of isosceles triangles. Each prism has a peak and a peak angle $\xi$. The peak angle $\xi$ of the prism ranges from 70° to 110° and the peak angle $\xi$ of 90° is preferred in particular. The peak of the prism is in a distance of 100 $\mu$m or less from the peak of the adjacent prism. The longitudinal direction of the lenticular layer of the light-guide panel is in an angular relationship of from 70° to 110° with respect to the positioning direction of the light source.

The ADF has a major axis arid a minor axis. The major and the minor axes of the ADF correspond to the long arid the short axes of a screen image formed by the light rays emerging from the ADF, respectively. The direction of the major axis of the ADF is in an angular relationship of from 70° to 100° with respect to the positioning direction of the light source. The direction of the minor axis of the ADF is in an angular relationship of from −20° to +20° with respect to the positioning direction of the light source. In particular, it is preferred that the ADF is placed such that the major and the minor axes of the ADF are perpendicular and parallel to the positioning direction of the light source, respectively. The ADF has an anisotropy ratio $\Omega/\omega$ of 2 or more, where $\Omega$ is an angle indicating the full width half a maximum (FWHM) of the intensity of the diffused light along the major axis and $\omega$ is an angle indicating FWHM of the intensity of the diffused light along the minor axis when collimated light is normally irradiated to the ADF. The angle $\Omega$ is preferred to be 30° or more. As an ADF, a holographic light diffusing film fabricated by holography is preferred.

The longitudinal direction of the lenticular layer included in the surface of the light collimating film is in an angular relation of from −20° to +20° to the positioning direction of the light source. In particular, it is preferred that the longitudinal direction is parallel to the positioning direction of the light source. The peak of each prism of the lenticular layer included on the one surface of the light collimating film is in a distance of 70 µm or less from the peak of the adjacent prism. The angle a between a first inclined side of the prism being farther from the light source and the smooth surface of the light collimating film is if the range of from 40° to 90°, while the angle β between a second inclined side of the prism being closer to the light source and the smooth surface of the light collimating film is in the range of from 40° to 60°.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference numerals indicate the same or the similar components, wherein.

DETAILED DESCRIPTION OF THE PREFERRED EMBODIMENTS

Preferred embodiments of this invention will be explained with reference to the accompanying drawings.

Figure 1A:
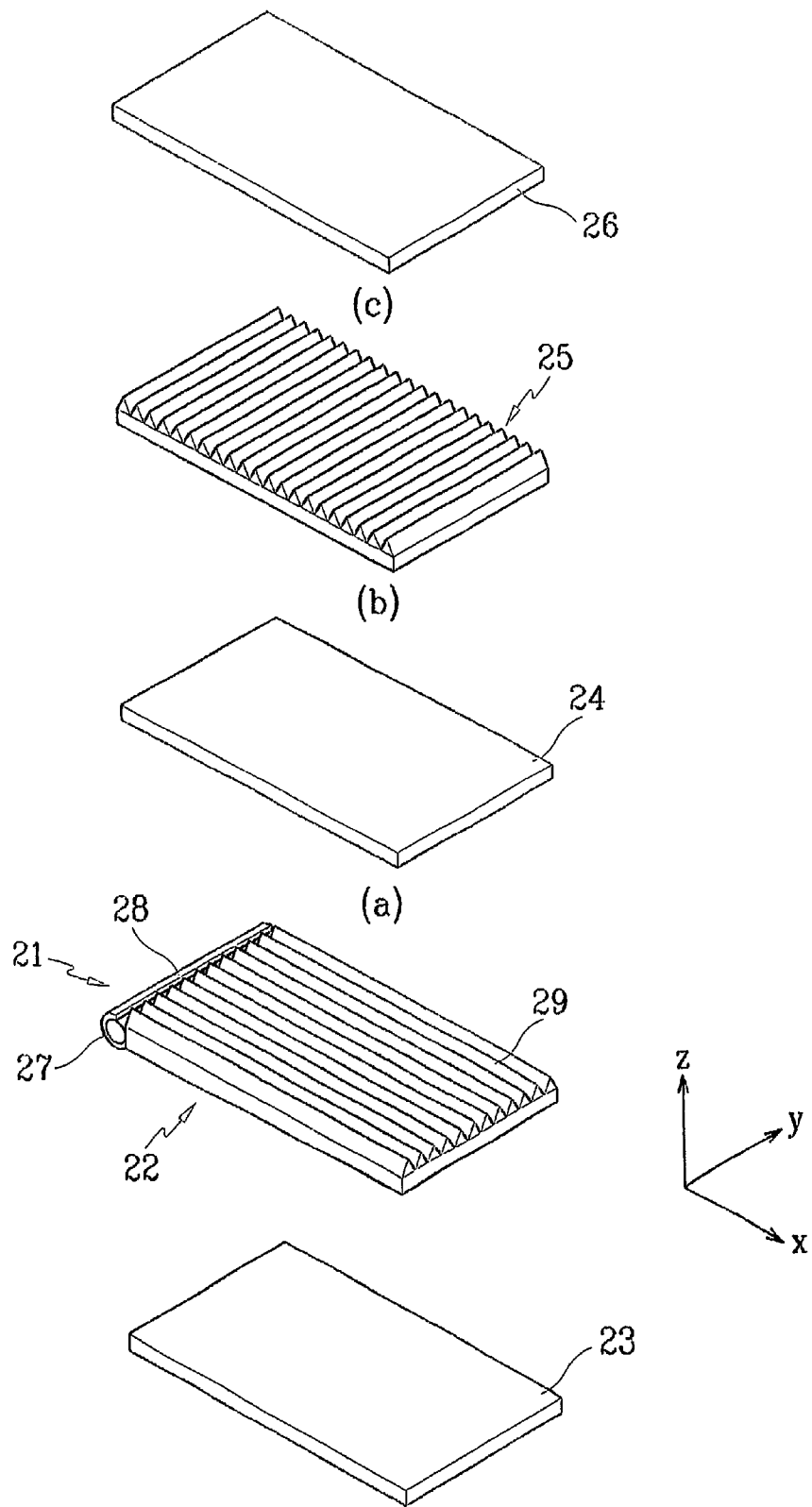
FIG. 1A is an exploded perspective view of a liquid crystal display with a backlight system according to one of the preferred embodiments of the present invention.

FIG. 1A is an exploded perspective view of a liquid crystal display with a backlight system according to one of the preferred embodiments of the present invention. As shown in FIG. 1A, the liquid crystal display includes a liquid crystal panel 26 in addition to the backlight system. The backlight system includes a light source 21, a light-guide panel 22, a light reflecting film 23, an ADF 24, and a light collimating film 25. The light source 21 is placed at an edge of the light-guide panel 22, and a light reflecting film 23 placed below the light-guide panel 22. The light-guide panel 22 is sequentially overlaid with the ADF 24 and the light collimating film 25. Another light source (not shown) may be provided at an opposing edge of the light-guide panel 22.

Figure 1B:
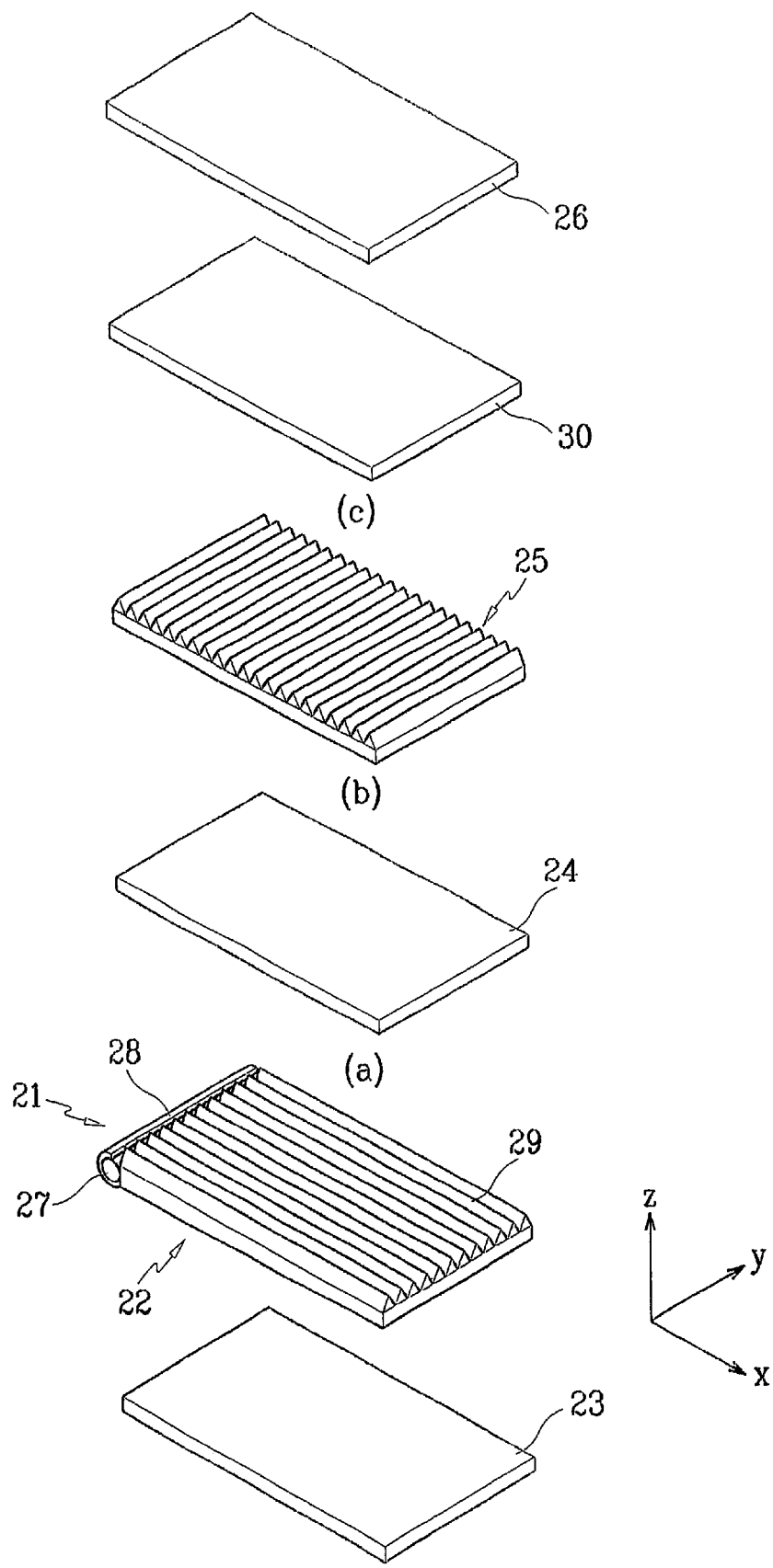
FIG. 1B is an exploded perspective view of a liquid crystal display with a backlight system according to another preferred embodiment of the present invention.

In order to enhance the luminance of the liquid crystal display with the backlight system according to the present invention, a reflective polarizer 30 is additionally placed over the light collimating film 25 as shown in FIG. 1B. FIG. 1B is an exploded perspective view of a liquid crystal display with a backlight system according to another preferred embodiment. When the reflective polarizer 30 is placed over the light collimating film 25, an absorptive polarizer (not shown) may be interpsosed between the reflective polarizer 30 and the liquid crystal panel 26 to obtain a higher contrast ratio. The more detailed descriptions of the backlight systems according to the present invention and the liquid crystal displays using the backlight systems, as shown in FIG. 1A and FIG. 1B, are as follows.

The light source 21 consists of a lamp 27 and a light reflecting lamp housing 28 at the edge of the light-guide panel 22. The light source 21 is oriented along they axis direction of the coordinate system shown in FIG. 1A. The coordinate system will be consistently applied in the subsequent drawings. A lenticular layer 29 is formed on the top surface of the light-guide panel 22 while extending in a predetermined direction. The lenticular layer 29 has a plurality of linear prisms and thus the cross-section of the lenticular layer 29 is of a series of triangles, more particularly, of a series of isosceles triangles. The longitudinal direction of the lenticular layer 29 has an angular relationship of from 70° to 110° with respect to the positioning direction of the light source 21. Preferably, the longitudinal direction of the lenticular layer 29 is perpendicular to the positioning direction of the light source 21.

Figure 2A:
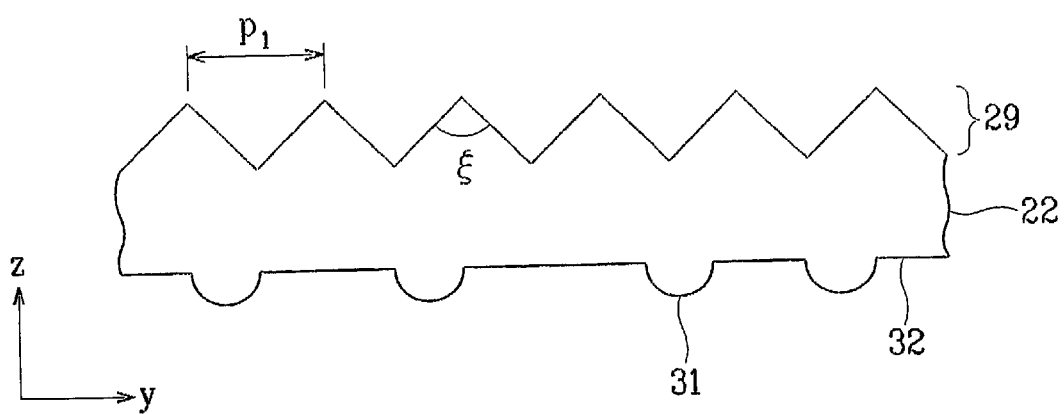
FIG. 2A is a yz-plane cross-sectional view of the light-guide panel.

FIG. 2A is an exaggerated yz-plane cross-sectional view of the light-guide panel 22. As shown in FIG. 2A, each prism has a peak and two sides inclined from the peal. The distance or pitch $P_1$ between two adjacent peaks is 100 µm or less, and the peak angle $\xi$ between the two inclined sides ranges from 70° to 110°. Particularly, the peak angle $\xi$ of 90° is preferable.

Figure 2B:
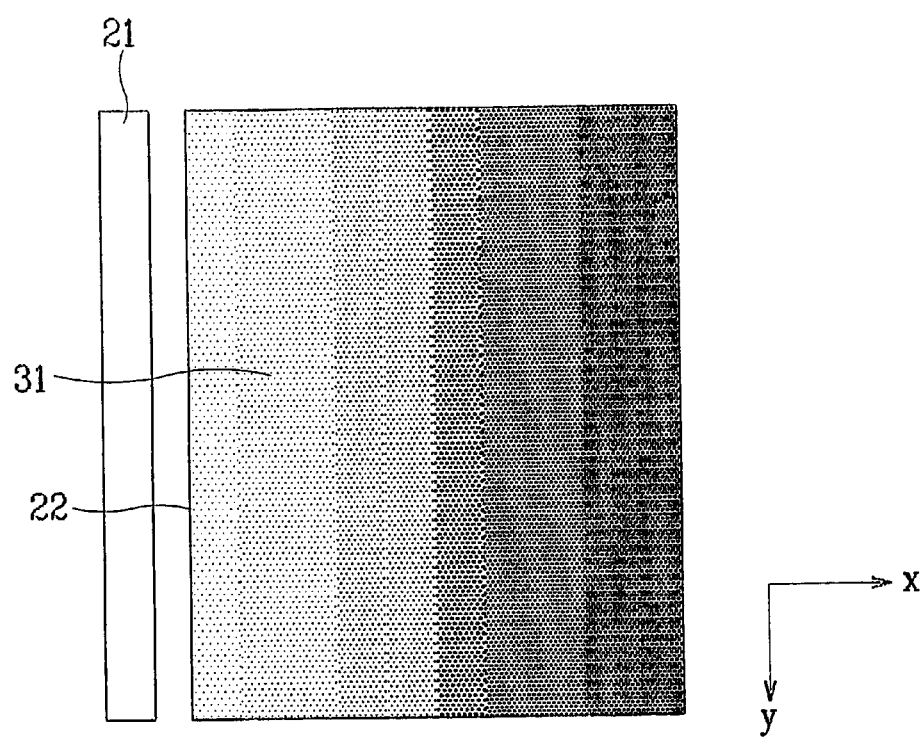
FIG. 2B is a schematic diagram illustrating a predetermined pattern on the bottom surface of the light-guide panel.

A predetermined pattern 31 is formed on the bottom surface of the light-guide panel 22 together with a smooth surface portion 32. FIG. 2B schematically illustrates a distribution of the pattern 31. The local density of the pattern 31 becomes greater at positions more distant from the light source 21 than those closer to the light source 21. This is to ensure more uniform luminance over the overall area of the light-guide panel 22.

The pattern 31 may be formed by a sand-blasting method, or a stamping method based on U.S. Pat. No. 5,776,636, an etching method, a printing method, or a direct engraving method using diamond bites or lasers. The specific shape of the pattern 31 is highly dependent upon the processing method. For example, when the sand-blasting method is employed, the pattern 31 is formed with an irregular shape. When the etching method or the direct engraving method is employed, the pattern 31 is formed with a plurality of minute lenses, or minute depressions, or minute extrusions. The scope of the present invention is not limited to the processing method of forming the pattern 31. The experimental results with different processing methods of forming the pattern will be described later with reference to FIGS. 7A to 8B.

The light-guide panel 22 is made of transparent dielectric materials, particularly, polymeric resins. For example, poly (methyl methacrylate) (PMMA) may be used for the light-guide panel 22.

In the present invention, the ADF 24 is placed over the light-guide panel 22.

The ADF 24 may be prepared by using the engraving method, the etching method, the stamping method or the hologram technique. For example, U.S. Pat. No. 5,473,454 discloses a technique of preparing an ADF with microsphere particles. In contrast, a holographic fight diffusing film prepared by using the holography technique has an advantage in that the degree of diffusion can be independently controlled in different directions. (see "Light Shaping Diffuser Technical Data Sheet" published by Physical Optics Corporation issued on Jul. 1, 1998) In the preferred embodiment, such a holographic light diffusing film is used for the ADF 24.

Figure 3A:
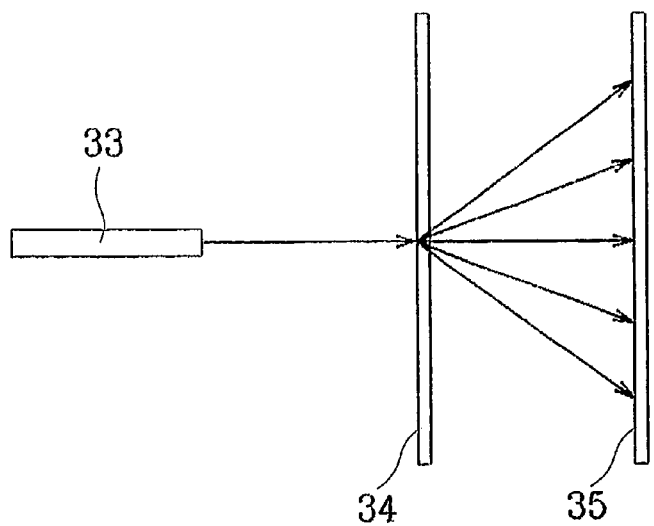
FIG. 3A is a schematic diagram illustrating a method for measuring optical characteristics of a light diffusing film.

Whether a light diffusing film is isotropic or anisotropic can be classified by observing a screen image when a collimated light is normally irradiated to the film. As showing in FIG. 3A, the diffused light rays emerging from a light diffusing film 34 are projected onto a screen 35 to make an image. The image formed on the screen 35 exhibits either a circular shape or an elliptical shape, depending on types of the light diffusing film 34. If the screen image is of a circular shape, the light diffusing film 34 is isotropic. In contrast, if the screen image is of an elliptical shape, the light diffusing film 34 is anisotropic.

Figure 3B:
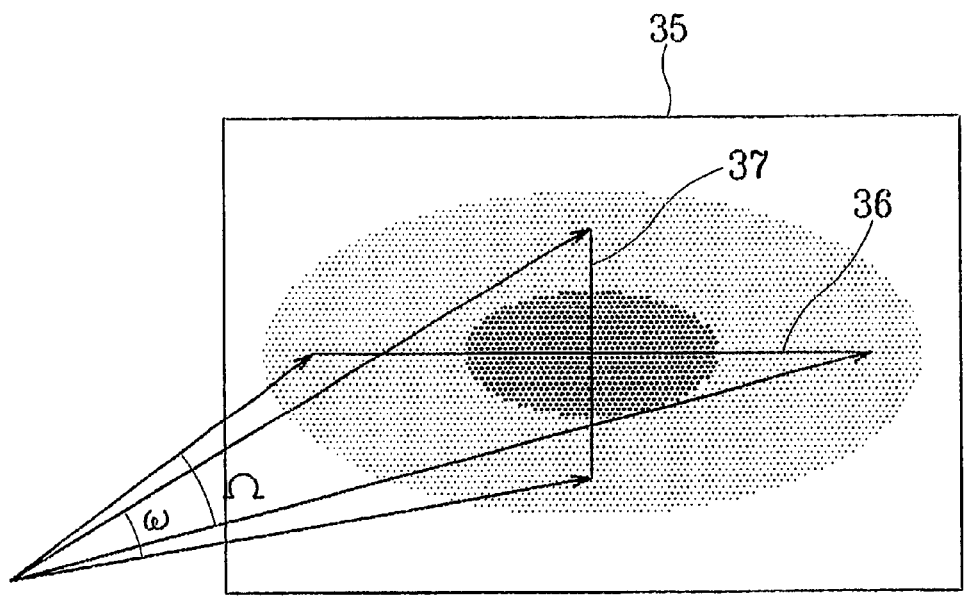
FIG. 3B is a perspective view of the screen shown in FIG. 3A.

FIG. 3B illustrates a screen image induced by the ADF 24 used in the invention. As shown in FIG. 3B, the major axis of the ADF 24 corresponds to a long axis 36 of the image formed on the screen 35, whereas the minor axis of the ADF 24 corresponds to a short axis 37 of the screen image. The screen image is brightest at the center of the elliptical image, and becomes dimmer as one goes closer to the peripheral portion of the elliptical image. The ADF 24 has a predetermined anisotropy ratio. The anisotropy ratio of the ADF 24 is expressed by $\Omega/\omega$. In case of an isotropic light diffusing film, $\Omega/\omega$ is equal to 1.

It is preferable that the anisotropy ratio $\Omega/\omega$ of the ADF 24 is 2 or more. Furthermore, the angle $\Omega$ is preferably 30° or more.

Further, it is very important in the invention how the ADF 24 is placed. The angle between the major axis direction of the ADF 24 and the positioning direction of the light source 21 is in the range of from 70° to 110°. The angle between the minor axis direction of the ADF 24 and the positioning direction of the light source 21 is in the range of from −20° to +20°. It is preferable that the major axis direction of the ADF 24 is perpendicular to the positioning direction of the light source 21, whereas the minor axis direction of the ADF 24 is parallel to the positioning direction of the light source 21.

Figure 4A:
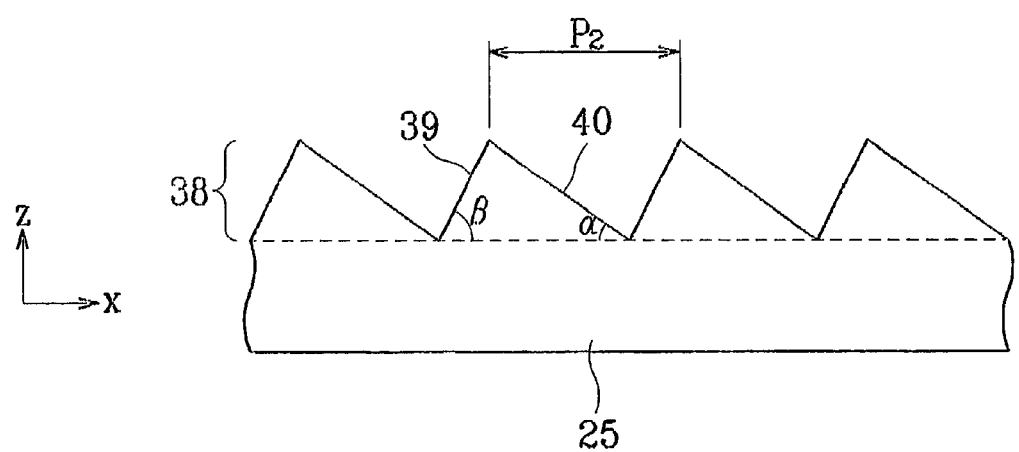
FIG. 4A is a xz-plane cross-sectional view of the light collimating film.

The cross-sectional shape of the light collimating film 25 placed on the ADF 24 is specifically illustrated in FIG. 4A. The light collimating film 25 has a smooth bottom surface, and a top surface with a lenticular layer 38 extending in a predetermined direction. The lenticular layer 38 is provided with a plurality of linear prisms. Each prism has a peak and two sides inclined from the peak. The distance or pitch $P_2$ between the peaks of two adjacent prisms is 70 µm or less. The angle between the longitudinal direction of the lenticular layer 38 and the positioning direction of the light source 21 is in the range of −20° to +20°. It is preferable that the longitudinal direction of the lenticular layer 38 is parallel to the positioning direction of the light source 21.

It is preferable that the angle α between the inclined side of the prism further from the light source 21 and the bottom surface of the light collimating film 25 ranges from 40° to 60°, and the angle β between the inclined side of the prism being closer to the light source 21 and the bottom surface of the light collimating film 25 ranges from 40° to 90°. The reason for this is that the angle between the luminance peak of the light ray just emerging from the light-guide panel 22 and the z axis of the coordinate system is approximately in the range of 60° to 80° (see Example 1 below), whereas the angle between the luminance peak of the light ray emerging from the ADF 24 and the z axis is approximately in the range of 30° to 40° (see Example 2 below). The light ray emerging from the ADF 24 and incident on the light collimating film 25 is asymmetric about the z axis in the xz-plane, and so α and β should be separately determined.

α can be determined as follows.

Figure 4B:
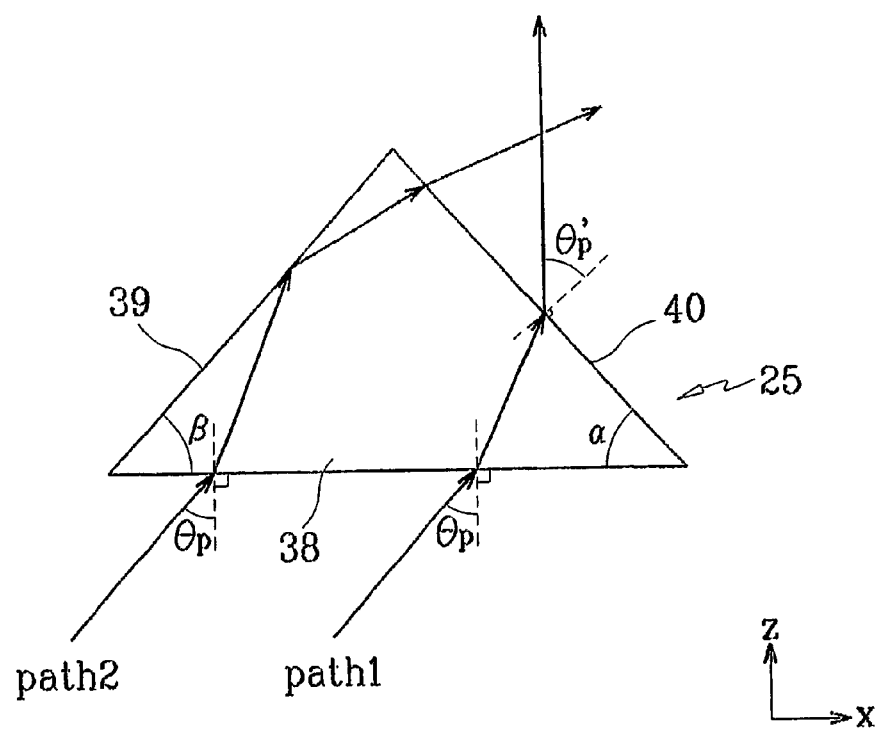
FIG. 4B is a xz-plane cross-sectional view of the triangular prism formed on the light collimating film.

As shown in FIG. 4B, when a incident light ray to the bottom surface of the light collimating film 25 having a refractive index n with an angle $\theta_p$ to the normal, emerges out of the inclined side 40 of the prism being far from the light source 21 with an angle $\theta_p'$ to the normal of the inclined side (path 1), the angle $\theta_p'$ satisfies the following mathematical formula 1.

$$\sin\theta_p' + n\sin\{\alpha - \sin^{-1}(\sin\theta_p/n)\} \qquad \text{[Mathematical formula 1]}$$

In order for the light ray to emerge to the normal of the liquid crystal panel 26, the angle $\theta_p'$ should satisfy the following mathematical formula 2.

$$\theta_p' = \alpha \qquad \text{[Mathematical formula 2]}$$

As the angle $\theta_p$ is put to be an angle at which the light ray emerging from the ADF 24 with the maximum luminance on the xz-plane the angle α is derived while satisfying both of the mathematical formulas 1 and 2. This is expressed by the following mathematical formula 3.

$$\sin \alpha = n \sin\{\alpha - \sin^{-1}(\sin \theta_p/n)\}$$ [Mathematical formula 3]

On the other hand, β can be determined as follows.

Suppose that β is equal to α. As shown in FIG. 4B, when an incident light ray to the bottom surface of the light collimating film 25 having a refractive index n with an angle $\theta_p$ to the normal emerges out of the inclined side 39 of the prism being close to the light source 21 (path 2), the light ray experiences total internal reflection at the inclined side 39 and escapes through the inclined side 40 of the prism being farther from the light source while largely deviating from the normal of the liquid crystal panel 26. That is, such a light ray does not contribute to head-on luminance of the liquid crystal display devices. So, the inclination of the inclined side 39 (tanβ) should be controlled to coincide with the direction at which the light ray travels within the prism. This is expressed by the mathematical formula 4.

$$\tan \beta = \cot\{\sin^{-1}(\sin \theta_p/n)\}$$ [Mathematical formula 4]

In addition to the aforementioned method for determining the angles α and β, Fresnel's equations concerning reflection and refraction should be considered. Since display devices using the backlight system should be provided with appropriate luminance and viewing angle characteristics, all of the angles α and β should be optimized by using proper techniques such as a ray-tracing method.

In another preferred embodiment of the present invention, a reflective polarizer 30 can be additionally placed over the light collimating film 25, as shown in FIG. 1B. As described earlier, FIG. 1B is an exploded perspective view of a liquid crystal display with the backlight system according to the invention. An absorptive polarizer (not shown) may be interposed between the reflective polarizer 30 and the liquid crystal panel 26 to obtain a higher contrast ratio.

A CLC polarizer should be used for the reflective polarizer 30 together with a λ/4 retarder. Then, the CLC polarizer faces the light collimating film 25, whereas the λ/4 retarder faces the absorptive polarizer or the liquid crystal plate 26. In order to obtain maximum luminance, the polarization axis of the CLC polarizer or the DBEF® should coincide with that of the absorptive polarizer.

The following examples further illustrate the present invention.

EXAMPLE 1

Ray profile emerging from the light-guide panel

The ray profile emerging from the top surface of the light-guide panel 22 was observed at the (a) position of FIG. 1A. The pattern 31 formed at the bottom surface of the light-guide panel 22 was processed by using the sand-blasting method. The peak angle ξ of each prism of the lenticular layer 29 formed at the top surface of the light-guide panel 22 was 90°. RF-188 of Tsujiden Co., Ltd. was used for the light reflecting film 23.

Direct current with a voltage of 12 V was applied to an inverter, and high frequency alternating current from the inverter flowed into the lamp. In all the experiments including Example 1, the lamp and the power consumption remained the same. The luminance was measured by a BM-7 device of Topcon Company.

Figure 5A:
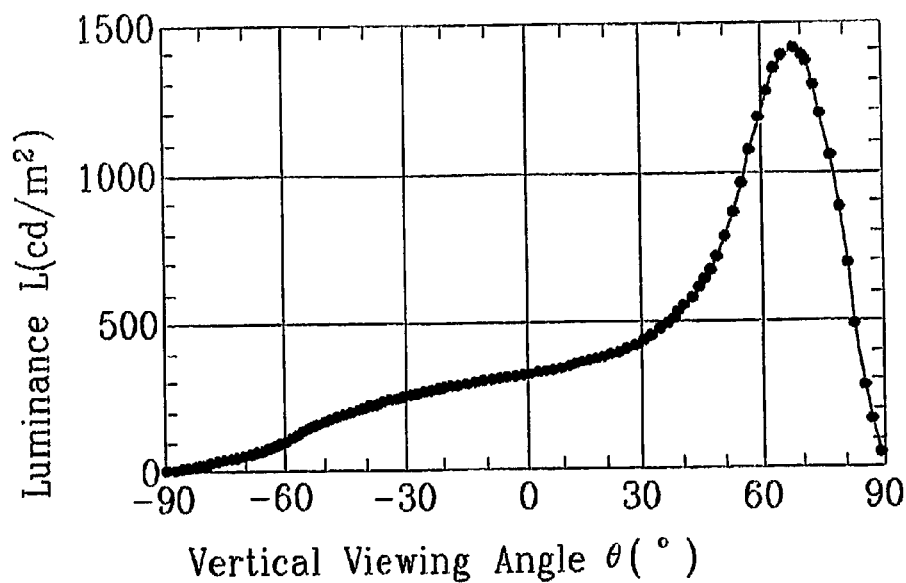
FIG. 5A is a graph illustrating luminance variation of tire light as a function of vertical viewing angles measured at the (a) position of FIG. 1A.
Figure 5B:
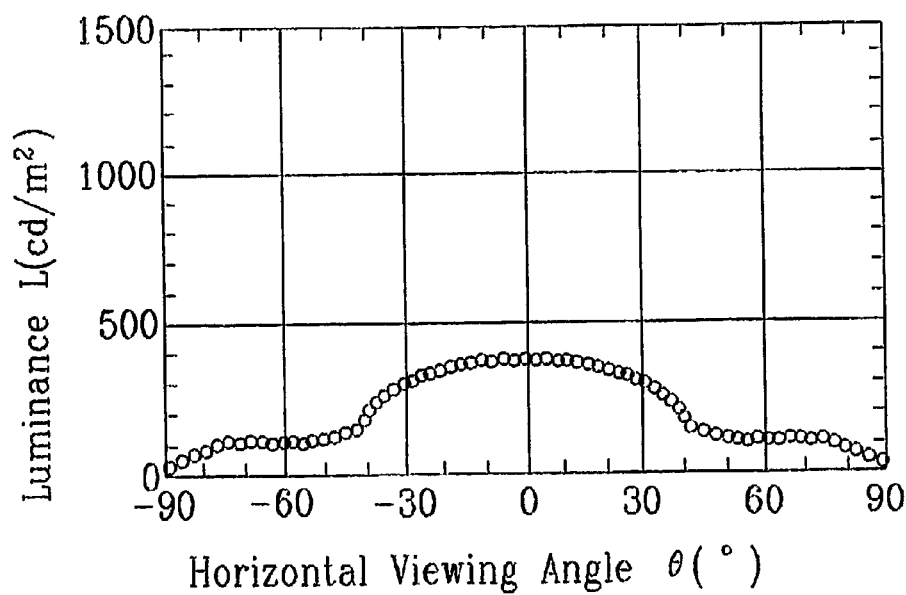
FIG. 5B is a graph illustrating luminance variation of the light as a function of horizontal viewing angles measured at the (a) position of FIG. 1A.

FIG. 5A is a graph illustrating luminance variation as a function of viewing angle θ in a plane perpenidicular to the lamp. FIG. 5B is a graph illustrating luminance variation as a function of viewing angle θ in a plane parallel to the lamp. In the drawings, θ=0° indicates the normal direction to the light-guide panel, θ>0° indicates that the luminance was measured in the plane formed by the +x axis and the +x axis (or the +y axis), and θ<0° indicates that the luminance was measured in the plane formed by the +z axis and the −x axis (or the −y axis). If the lamp 27 is linearly positioned at the lower edge of the liquid crystal display from the viewpoint of a viewer, the graph shown in FIG. 5A indicates the luminance variation as a function of vertical viewing angles. Similarly, the graph shown in FIG. 5B indicates the luminance variation as a function of horizontal viewing angles. The following experimental results will be described pursuant to these definitions.

The luminance value was highest when the viewing angle in the vertical direction was in the range of 60° to 80°. These results will be similarly obtained even when any method other than the sand-blasting method is used for processing the bottom surface of the light-guide panel 22.

EXAMPLE 2

Ray profile emerging from the ADF

The ray profile emerging from the top surface of the ADF 24 was observed at the (b) position of FIG. 1A. With all the components of the backlight system used in Example 1, a holographic light diffusing film of Physical Optics Corporation, where Ω=95° and ω=25° (Ω/ω=3.8), was used for the ADF 24.

Figure 6A:
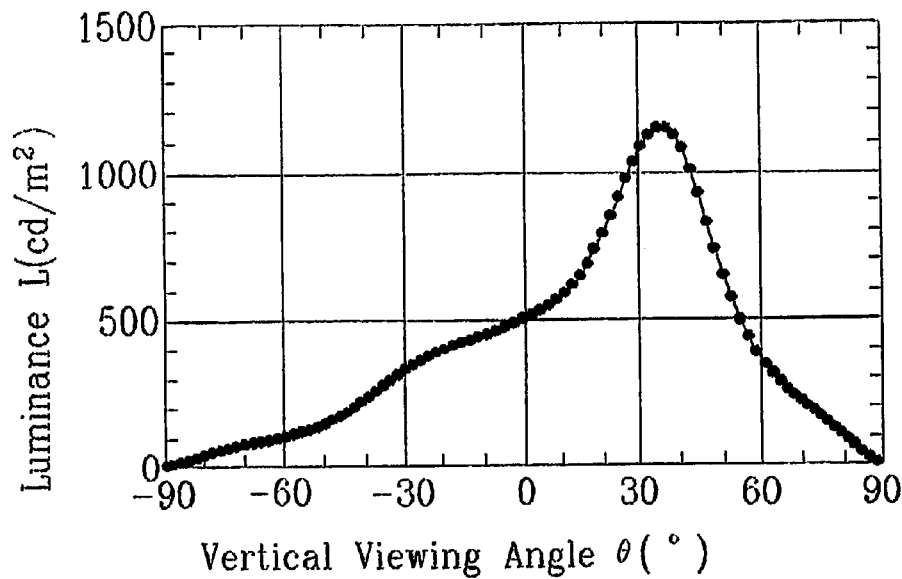
FIG. 6A is a graph illustrating luminance variation of the light as a function of vertical viewing angles measured at the (b) position of FIG. 1A.
Figure 6B:
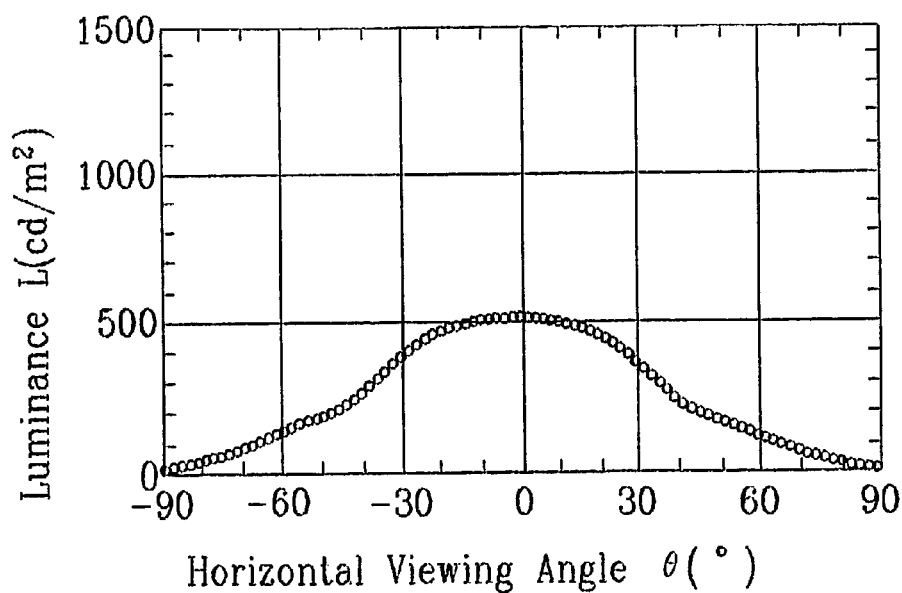
FIG. 6B is a graph illustrating luminance variation of the light as a function of horizontal viewing angles measured at the (b) position of FIG. 1A.

FIG. 6A is a graph illustrating luminance variation as a function of vertical viewing angles. FIG. 6B is a graph illustrating the luminance variation as a function of horizontal viewing angles. The ray profile emerging from the light-guide panel 22, as shown in FIG. 5A, exhibited the maximum luminance value at +67° in the vertical direction, whereas the ray profile emerging from the ADF 24, as shown in FIG. 6A, exhibited the maximum value at about +36°. Thus, it turned out that the angle showing the maximum luminance moved closer to the normal. The shape of the luminance variation as a function of horizontal viewing angles shown in FIG. 6B was nearly the same as that of the luminance variation shown in FIG. 5B, except the head-on luminance increased.

The anisotropy ratio Ω/ω of the ADF 24 largely influences luminance as a function of viewing angles. For example, when an ADF having a smaller anisotropy ratio is used, it unnecessarily diffuses a large amount of light in the horizontal direction so that the overall luminance of the backlight system was reduced at the light collimating film installation.

EXAMPLE 3

Ray profile emerging from the light collimating film

The ray profile emerging from the light collimating film 25 was observed at the (c) position of FIG. 1A. With all the components of the backlight system used in Example 2, the light collimating film with α=45° and β=45° was used. The results are given in the graphs shown in FIGS. 7A and 7B which show the luminance variations as a function of vertical and horizontal viewing angles respectively. It can be seen from the graphs that the angle showing the maximum luminance in the vertical direction is shifted to be almost in the normal direction.

Figure 7A:
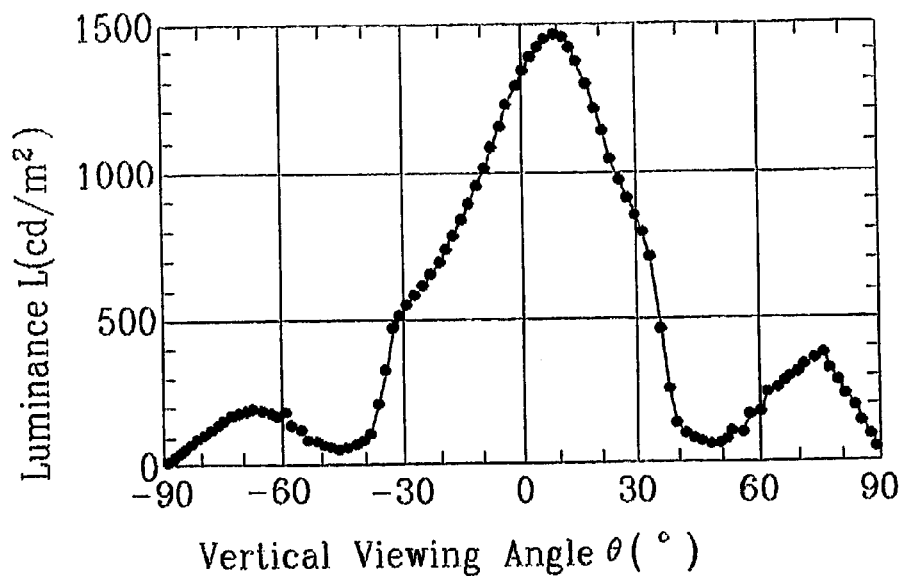
FIG. 7A is a graph illustrating luminance variation of the light as a function of vertical viewing angles measured at the (c) position of FIG. 1A.
Figure 7B:
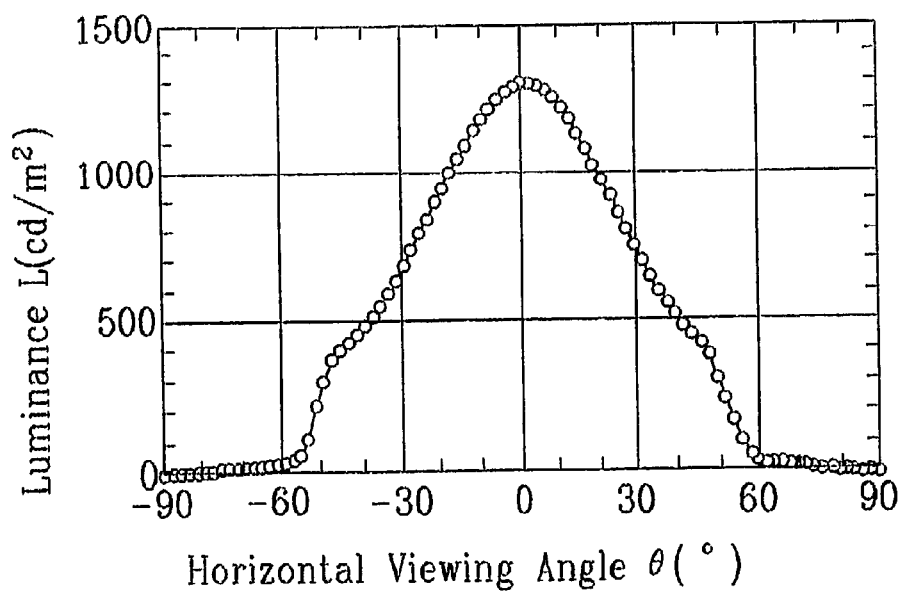
FIG. 7B is a graph illustrating luminance variation of the light as a function of horizontal viewing angles measured at the (c) position of FIG. 1A.
Figure 7C:
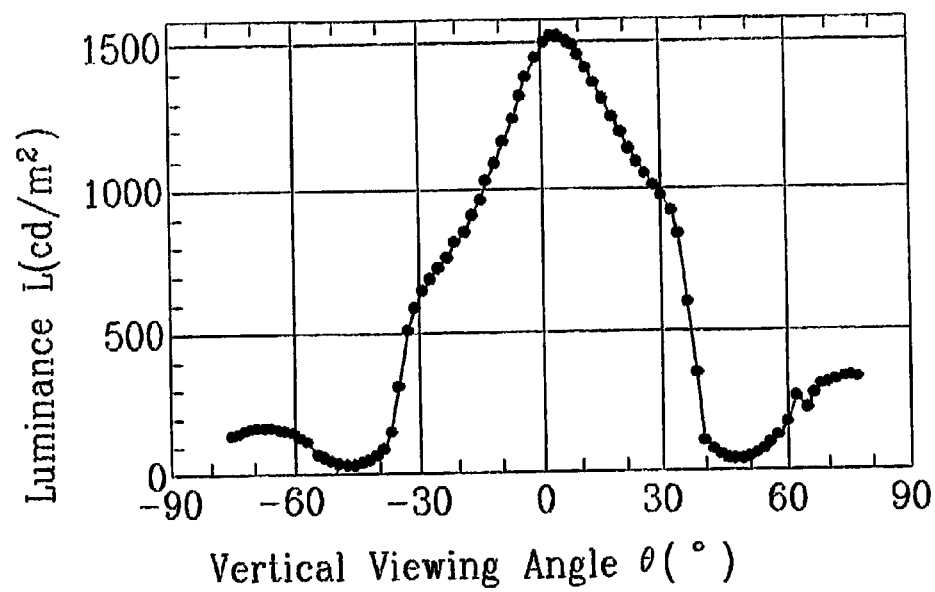
FIG. 7C is a graph illustrating another luminance variation of the light as a function of vertical viewing angles measured at the (c) position of FIG. 1A.

When the ADF with Ω=60° and ω=1° (Ω/ω60) was used, the results are given in the graphs shown in FIG. 7C which shows the luminance variation as a function of vertical viewing angles. It can be seen from the graph shown in FIG. 7C that the angle showing the maximum luminance value in the vertical direction is shifted to be almost in the normal direction, as in the graph shown in FIG. 7A.

Example 4

Effects of the pattern processing technique of the light-guide panel

As described earlier, the bottom surface of the light-guide panel used in Examples 1 to 3 was made by the sand-blasting method. In this example, however, the bottom surface of the light-guide panel 22 was processed to have a predetermined pattern by using the etching method. The pattern was provided with a plurality of minute convex lenses each having a diameter of 120 μm and a height of 30 μm. Other components of the backlight system including the lenticular layer 29 formed on the top surface of the light-guide panel 22 were like those used in Example 3.

Figure 8A:
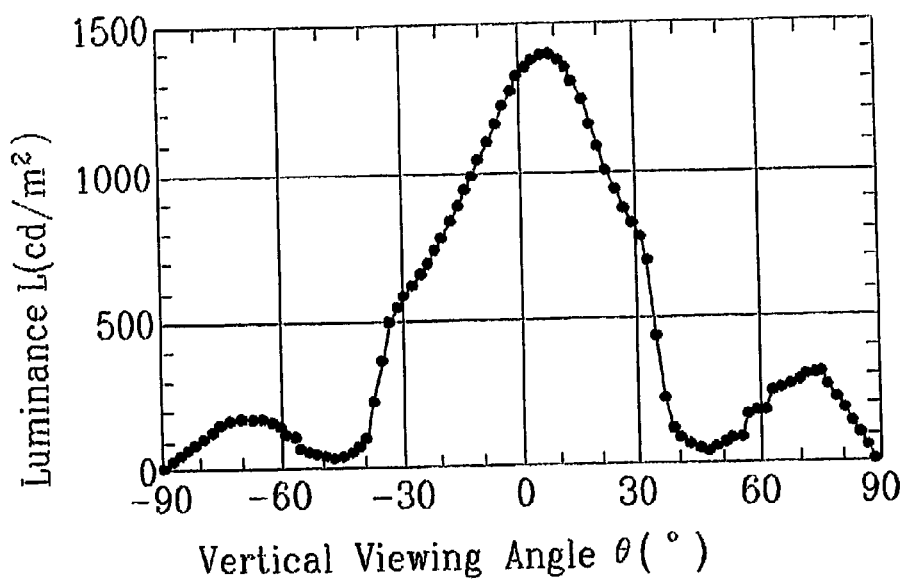
FIG. 8A is a graph illustrating still another luminance variation of the light as a function of vertical viewing angles measured at the (c) position of FIG. 1A.
Figure 8B:
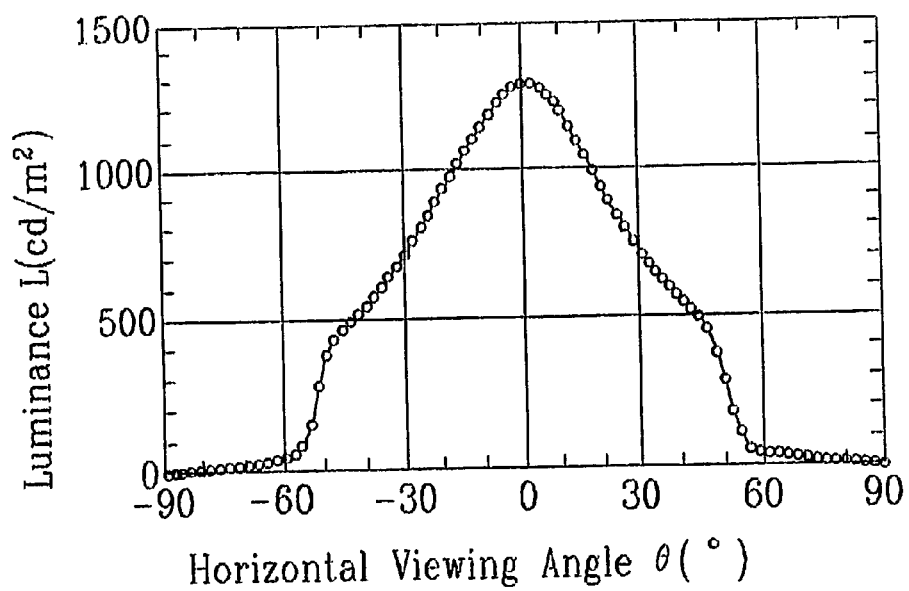
FIG. 8B is a graph illustrating another luminance variation of the light as a function of horizontal viewing angles measured at the (c) position of FIG. 1A.

The ray profile emerging from the light collimating film 25 was observed at the (c) position of FIG. 1A as in Example 3. The results are given in FIGS. 8A and 8B which show the luminance variations as a function of vertical and horizontal viewing angles respectively. When the luminance values as a function of viewing angles shown in FIGS. 8A and 8B are compared with those given it FIGS. 7A and 7B, it can be seen that they are nearly the same, respectively. Therefore, the scope of the present invention is not limited to any specific pattern processing method for the bottom surface of the light-guide panel 22.

EXAMPLE 5

Comparison in optical characteristics between the backlight system according to the present invention and the backlight system according to the prior art In order to compare the optical characteristics of the inventive backlight system with those of the prior art-based backlight system, the following experiments were performed.

Figure 9:
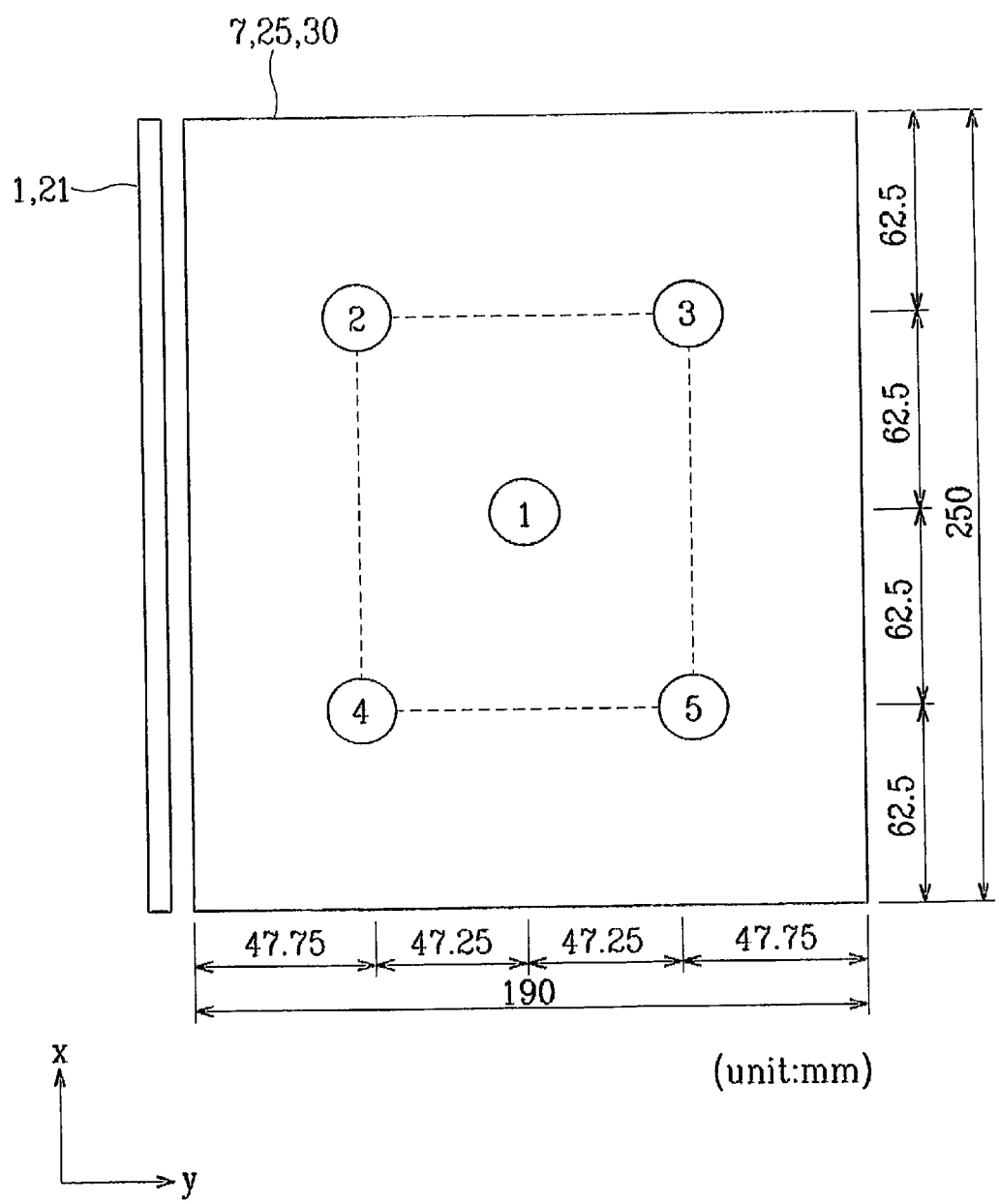
FIG. 9 is a top view of the backlight system shown in FIGS. 1A, 1B and 10 illustrating luminance measuring positions.
Figure 10:
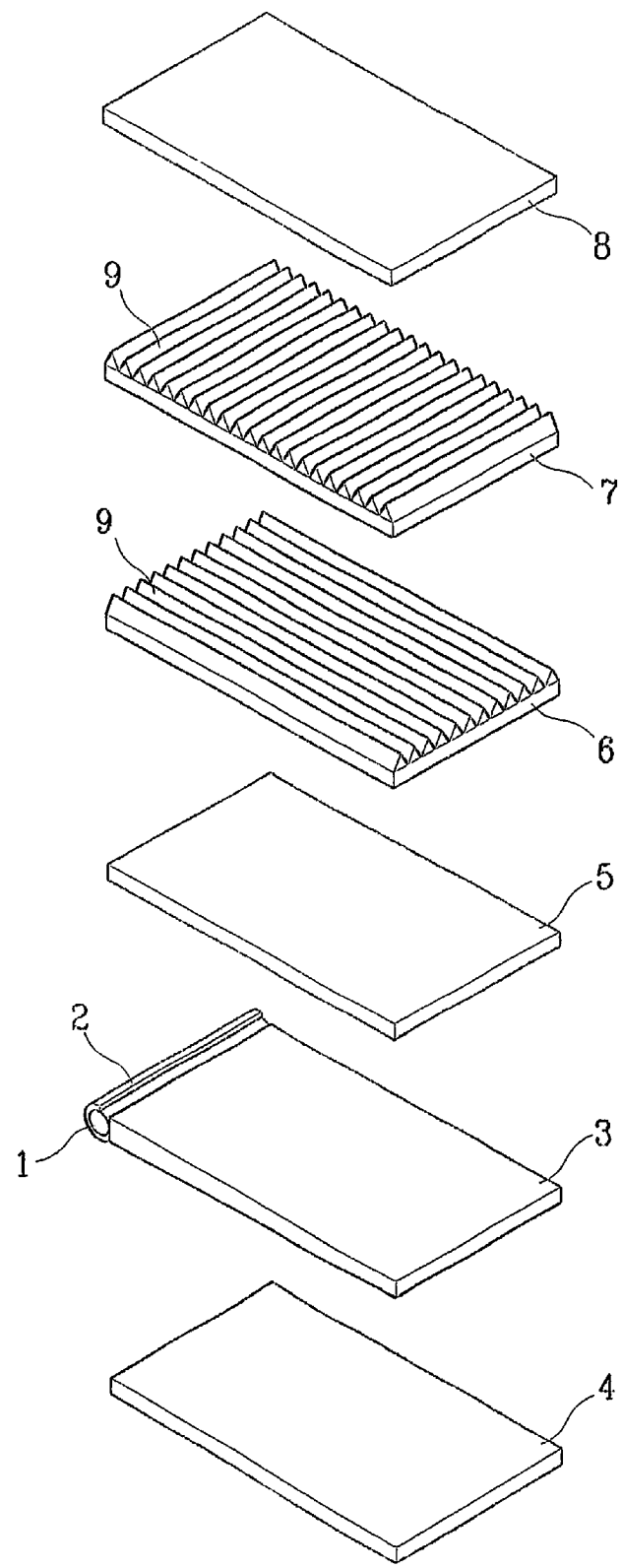
FIG. 10 is an exploded perspective view of a liquid crystal display with a backlight system according to a prior art.

In the backlight system according to the prior art as shown in FIG. 10, RF-188 of Tsujiden Co., Ltd. was used for the light reflecting film 4. The light-guide panel 3 was prepared by using an etching method such that the top surface of the light-guide panel 3 was smooth and the bottom surface of the light-guide panel had a pattern with a plurality of minute convex lenses. Each convex lens had a diameter of 100 μm and a height of 30 μm. BS-01 of Keiwa Company, that is an isotropic light diffusing film, was used for the diffusion film 5. Two BEF®s of Minnesota Mining and Manufacturing Company were provided onto the light diffusing film as the light collimating films 6 and 7 by using a technique based on U.S. Pat. 4,542,449. An absorptive polarizer was placed over the second light collimating film 7. As shown in FIG. 9, points 1, 2, 3, 4 and 5 were taken on the backlight system, luminance values were measured at the five points, and an average luminance value $L_{ave}$ was obtained. It was found that the average luminance value $L_{ave}$ was 510cd/m².

On the other hand, in the backlight system shown in FIG. 1A, a silver-deposited film was used for the light reflecting film 23. The bottom surface of the light-guide panel 22 was processed by using the etching method such that it had a pattern with a plurality of minute convex lenses. Each convex lens had a diameter of 100 μm and a height of 30 μm. The top surface of the light-guide panel 22 was processed such that it had a lenticular layer with linear prisms, of which the cross-section has a plurality of isosceles triangular-shape. Each prism had a peak angle of 90°. A holographic light diffusing film with Ω=95° and ω=25° (Ω/ω=3.8) was used for the ADF 24. The light collimating film 25 with α=45° and β=45° was placed over the ADF 24. An absorptive polarizer was placed over the light collimating film 25. The luminance values were measured on the aforementioned points 1, 2, 3, 4 and 5, and an average luminance value $L_{ave}$ was obtained. It turned out that the average luminance value $L_{ave}$ was 520cd/m².

It turned out from the aforementioned experimental results that the same or greater luminance value can be obtained with a smaller number of optical films. Therefore, in the inventive configuration, the backlight system fabrication process can be more simplified and a cost-effective backlight system can be obtained.

EXAMPLE 6

Application of a reflective polarizer

In order to examine the luminance enhancement effect with the application of the reflective polarizer 30 shown in FIG. 1B, the following experiments were performed.

As in Example 5, the backlight system according to the prior art was prepared. A CLC polarizer was provided under the absorptive polarizer together with a λ/4 retarder such that the light transmission axis of the CLC polarizer agreed with that of the absorptive polarizer. The luminance values were measured on the aforementioned points 1, 2, 3, 4 and 5, and an average luminance value $L_{ave}$ was obtained. It turned out that the average luminance value $L_{ave}$ was 664 cd/m². When this value is compared with that of the prior art-based backlight system without any CLC polarizer, it can be seen that the luminance enhancement rate owing to the presence of the CLC polarizer is 30%.

On the other hand, the backlight system according to the present invention was prepared as was in Example 5. A CLC polarizer was provided under the absorptive polarizer together with a 8/4 retarder such that the light transmission axis of the CLC polarizer agreed with that of the absorptive polarizer. The luminance values were measured on the aforementioned points 1, 2, 3, 4 and 5, and an average luminance value $L_{ave}$ was obtained. It turned out that the average luminance value $L_{ave}$ was 726cd/m². When this value is compared with that of the inventive backlight system without any CLC polarizer, it can be seen that the luminance enhancement rate owing to the presence of the CLC polarizer is 40%.

These experimental results demonstrate that, with the application of the CLC polarizer, the inventive backlight system can serve to give a higher luminance characteristic in display device applications compared to the prior-art based backlight system.

As described above, in the inventive backlight system, cost-effective production can be ensured with smaller number of optical films, resulting in simplified production process and increased productivity. Furthermore, with the application of the reflective polarizer, the backlight system can serve to give a higher luminance characteristic in display device applications. In addition, the backlight system may be employed for use in advertising means or in lighting devices.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A backlight system comprising:
   a light-guide panel made of a transparent dielectric material;
   at least one light source comprising at least one lamp and a light reflecting lamp housing, being placed at an edge of the light-guide panel;
   a light reflecting film placed below the light-guide panel;
   an anisotropic light diffusing film made of a transparent dielectric material and being disposed over the light-guide pal, the anisotropic light diffusing film having directionally different light diffusing properties; and
   a light collimating film made of a transparent dielectric material, the light collimating film having a top surface and a smooth bottom surface, the smooth bottom surface of the light collimating film facing the anisotropic light diffusing film, the top surface of the light collimating film including a lenticular layer extending in a predetermined direction, the lenticular layer having a plurality of linear prisms and each having a cross-section in a shape of a triangle, each prism having a peak and a first side and a second side each inclined from the peal, the second inclined side being closer to the light source than the first inclined side.

2. The backlight system of claim 1 further comprising a reflective polarizer placed over the light collimating film.

3. The backlight system of claim 1 wherein the light-guide panel has a top surface including a lenticular layer extending in a predetermined direction, and a bottom surface including a predetermined pattern.

4. The backlight system of claim 3 wherein the lenticular layer included in the top surface of the light-guide panel has a plurality of linear prisms each having a cross-section in a shape of a triangle.

5. The backlight system of claim 3 wherein the lenticular layer included in the top surface of the light-guide panel has a plurality of linear prisms each having a cross-section in a shape of an isosceles triangles.

6. The backlight system of claim 5 wherein each said prism has a peak and a peak angle $\xi$, and the peak angle $\xi$ of the prism is from 70° to 110°.

7. The backlight system of claim 3 wherein the longitudinal direction of the lenticular layer has an angular relationship of from 70° to 110° with respect to a positioning direction of the light source.

8. The backlight system of claim 4 wherein each said prism has a peak, and the peak of each said prism is located no more than 100 $\mu$m in distance away from the peak of an adjacent prism.

9. The backlight system of claim 3 wherein the top surface of the light-guide panel with the lenticular layer faces the anisotropic light diffusing film, and the bottom surface of the light-guide panel with the pattern faces the light reflecting film.

10. The backlight system of claim 1 wherein the anisotropic light diffusing film has a major axis and a minor axis, the major axis of the anisotropic light diffusing film having an angular relationship of from 70° to 110° with respect to a positioning direction of the light source, and the minor axis of the anisotropic light diffusing film having an angular relationship of from −20° to +20° with respect to the positioning direction of the light sources.

11. The backlight system of claim 1 wherein the anisotropic light diffusing film has an anisotropy ratio of at least 2.

12. The backlight system of claim 1 wherein the angle $\Omega$ of the anisotropic light diffusing film is at least 30°.

13. The backlight system of claim 1 wherein the anisotropic light diffusing film is a holographic light diffusing film fabricated by holography.

14. The backlight system of claim 1 wherein a longitudinal direction of the lenticular layer included in the top surface of the light collimating film has an angular relationship of from −20° to +20° with respect to the positioning direction of the light source.

15. The backlight system of claim 1 wherein the peak of each said prism of the lenticular layer included in the top surface of the light collimating film is located no more than 70 $\mu$m in distance away from the peak of an adjacent prism.

16. The backlight system of claim 1 wherein an angle $\alpha$ between the first inclined side of each prism of the lenticular layer included in the top surface of the light collimating film and the smooth bottom surface of the light collimating film is in the range of from 40° to 60° while the angle $\beta$ between the second inclined side of each prism of the lenticular layer included in the top surface of the light collimating film and the smooth bottom surface of the light collimating film is in the range of from 40° to 90°.

17. A backlight system comprising:
   a light-guide panel made of a transparent dielectric material;
   at least one light source consisting of at least one lamp and a light reflecting lamp housing, the light source being placed at an edge of the light-guide panel;
   a light reflecting film placed below the light-guide panel;
   an anisotropic light diffusing film made of a transparent dielectric material and being disposed over the light-guide panel, the anisotropic light diffusing film having directionally different light diffusing properties; and
   a light collimating film made of a transparent dielectric material, the light collimating film having a top surface and a smooth bottom surface, the smooth bottom surface of the light collimating film facing the anisotropic light diffusing film, the top surface of the light collimating film including a lenticular layer extending in a predetermined direction, the lenticular layer having a plurality of linear prisms each having a cross-section in a shape of a triangle, each prism having a peak and a first side and a second side each inclined from the peak, the first inclined side being farther from the light source than the second inclined side;
   wherein a top surface of the light-guide panel includes a lenticular layer extending in a predetermined direction, a bottom surface of the light-guide panel includes a predetermined pattern, and a longitudinal direction of the lenticular layer is substantially perpendicular to a positioning direction of the light source;
   wherein the anisotropic light diffusing film has a major axis and a minor axis, the major axis of the anisotropic light diffusing film being substantially perpendicular to the positioning direction of the light source, and the minor axis of the anisotropic light diffusing film being substantially parallel to the positioning direction of the light source; and
   wherein the longitudinal direction of the lenticular layer included in the top surface of the light collimating film is substantially parallel to the positioning direction of the light source.

18. The backlight system of claim 17 further comprising a reflective polarizer placed over the light collimating film.

19. A method of fabricating a backlight system having at least one light source comprising at least one lamp and a light reflecting lamp housing, a light-guide panel with a predetermined pattern formed on a first surface and a prism-based lenticular layer formed on a second surface, a light reflecting film, an anisotropic light diffusing film with a major axis and a minor axis, and a light collimating film with a smooth surface and a prism-based lenticular layer formed surface, the method comprising:

positioning the light source at an edge of the light-guide panel;

placing the light-guide panel over the light reflecting film such that a longitudinal direction of the lenticular layer of the light-guide panel is substantially perpendicular to a positioning direction of the light source;

placing the anisotropic light diffusing film over the light-guide panel such that the major axis of the anisotropic light diffusing film is substantially perpendicular to the positioning direction of the light source, and the minor axis of the anisotropic light diffusing film is substantially parallel to the positioning direction of the light source; and placing the light collimating film over the anisotropic light diffusing film such that the smooth surface of the light collimating film faces the anisotropic light diffusing film and a longitudinal direction of the lenticular layer of the light collimating film is substantially parallel to the positioning direction of the light source.

20. The method of fabricating the backlight system of claim 19 further comprising placing a reflective polarizer over the light collimating film.

21. A liquid crystal display device having a backlight system, the backlight system comprising:

a light-guide panel made of a transparent dielectric material;

at least one light source comprising at least one lamp and a light reflecting lamp housing, the light source being placed at an edge of the light-guide panel;

a light reflecting film placed below the light-guide panel;

an anisotropic light diffusing film made of a transparent dielectric material and placed over the light-guide panel, the anisotropic light diffusing film having directionally different light diffusing properties; and a light collimating film made of a transparent dielectric material, the light collimating film having a top surface and a smooth bottom surface, the smooth bottom surface of the light collimating film facing the anisotropic light diffusing film, the top surface of the light collimating film including a lenticular layer extending in a predetermined direction, the lenticular layer having a plurality of linear prisms each having a cross-section in a shape of a triangle, each prism having a peak and a first side and a second side each inclined from the peak, the first inclined side being farther from the light source than the second inclined side.

22. The liquid crystal display device of claim 21, wherein the backlight system further comprises a reflective polarizer placed over the light collimating film.

23. A liquid crystal display device having a backlight system, the backlight system comprising:

a light-guide panel made of a transparent dielectric material;

at least one light source consisting of at least one lamp and a light reflecting lamp housing, the light source being placed at an edge of the light-guide panel;

a light reflecting film placed below the light-guide panel;

an anisotropic light diffusing film made of a transparent dielectric material and being disposed over the light-guide panel, the anisotropic light diffusing film having directionally different light diffusing properties; and a light collimating film made of a transparent dielectric material, the light collimating film having a top surface and a smooth bottom surface, the smooth bottom surface of the light collimating film facing the anisotropic light diffusing film, the top surface of the light collimating film including a lenticular layer extending in a predetermined direction, the lenticular layer having a plurality of linear prisms each having a cross-section in a shape of a triangle, each prism having a peak and a first side and a second side each inclined from the peak, the first inclined side being farther from the light source than the second inclined side;

wherein a top surface of the light-guide panel includes a lenticular layer extending in a predetermined direction, a bottom surface of the light-guide panel includes a predetermined pattern, and a longitudinal direction of the lenticular layer is substantially perpendicular to a positioning direction of the light source;

wherein the anisotropic light diffusing film has a major axis and a minor axis, the major axis of the anisotropic light diffusing film being substantially perpendicular to the positioning direction of the light source, and the minor axis of the anisotropic light diffusing film being substantially parallel to the positioning direction of the light source; and wherein the longitudinal direction of the lenticular layer included in the top surface of the light collimating film is substantially parallel to the positioning direction of the light source.

24. The liquid crystal display device of claim 23, wherein the backlight system further comprises a reflective polarizer placed over the light collimating film.

\* \* \* \* \*